April 22, 1969        E. R. BARRETT        3,439,706
REMOTE VALVE ACTUATION AND INDICATION SYSTEM
Filed March 2, 1966        Sheet _1_ of 3
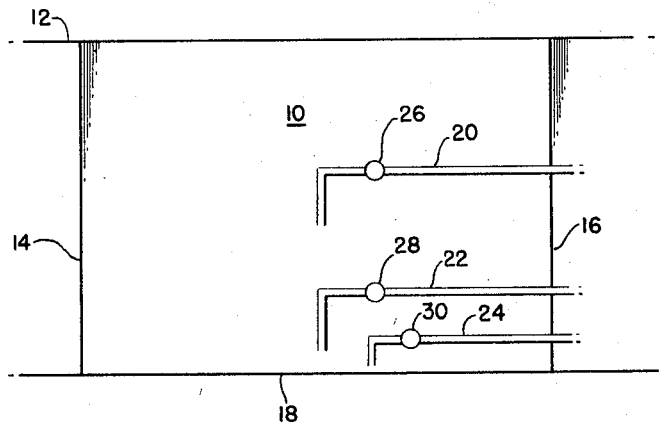
FIG__1
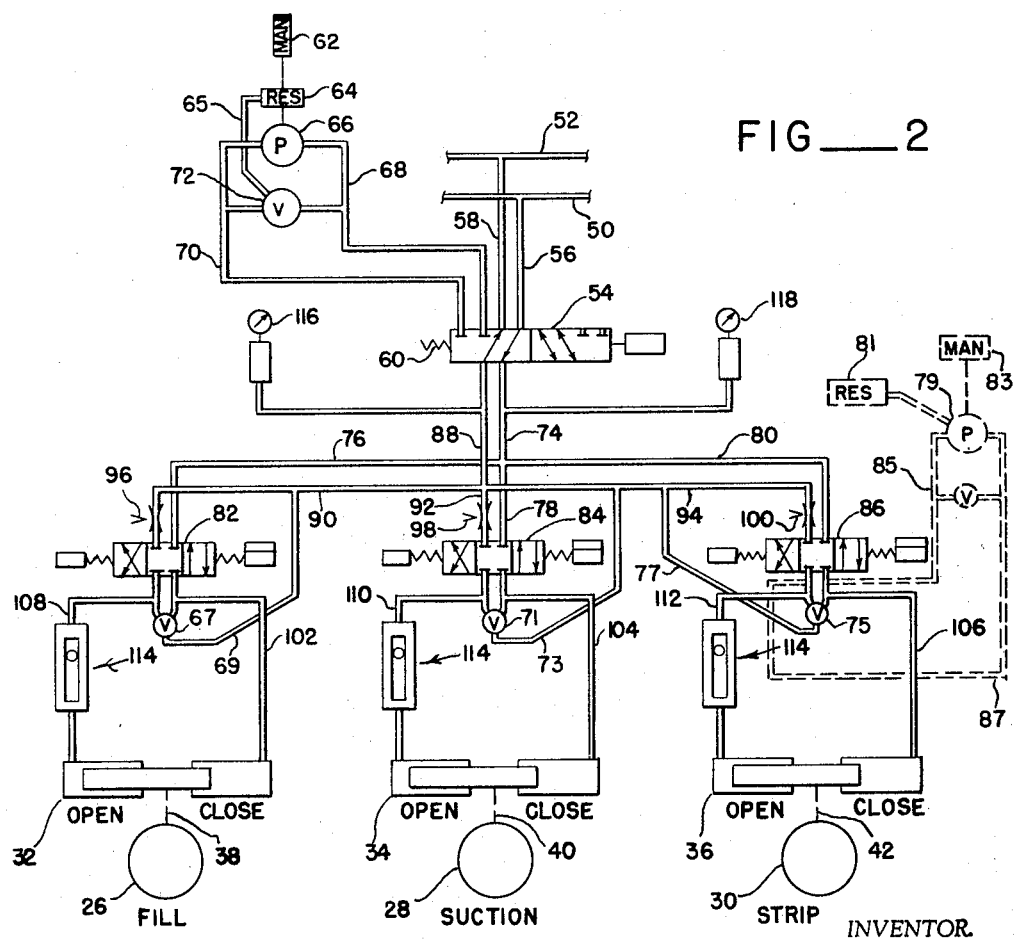
FIG__2
INVENTOR.
EDWIN R. BARRETT
BY *Graybeal, Cole & Barnard*
ATTORNEYS

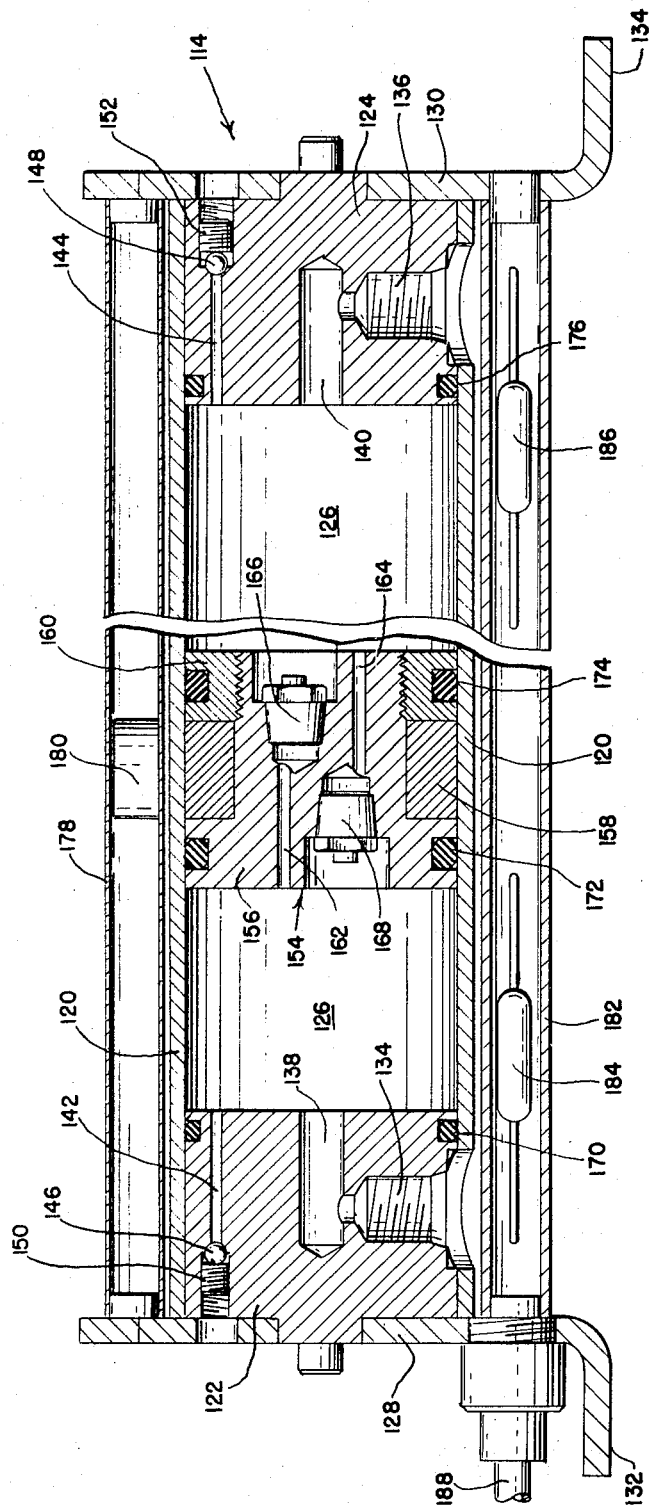
FIG—3

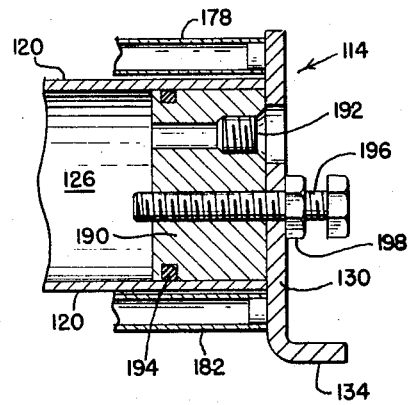
FIG__4
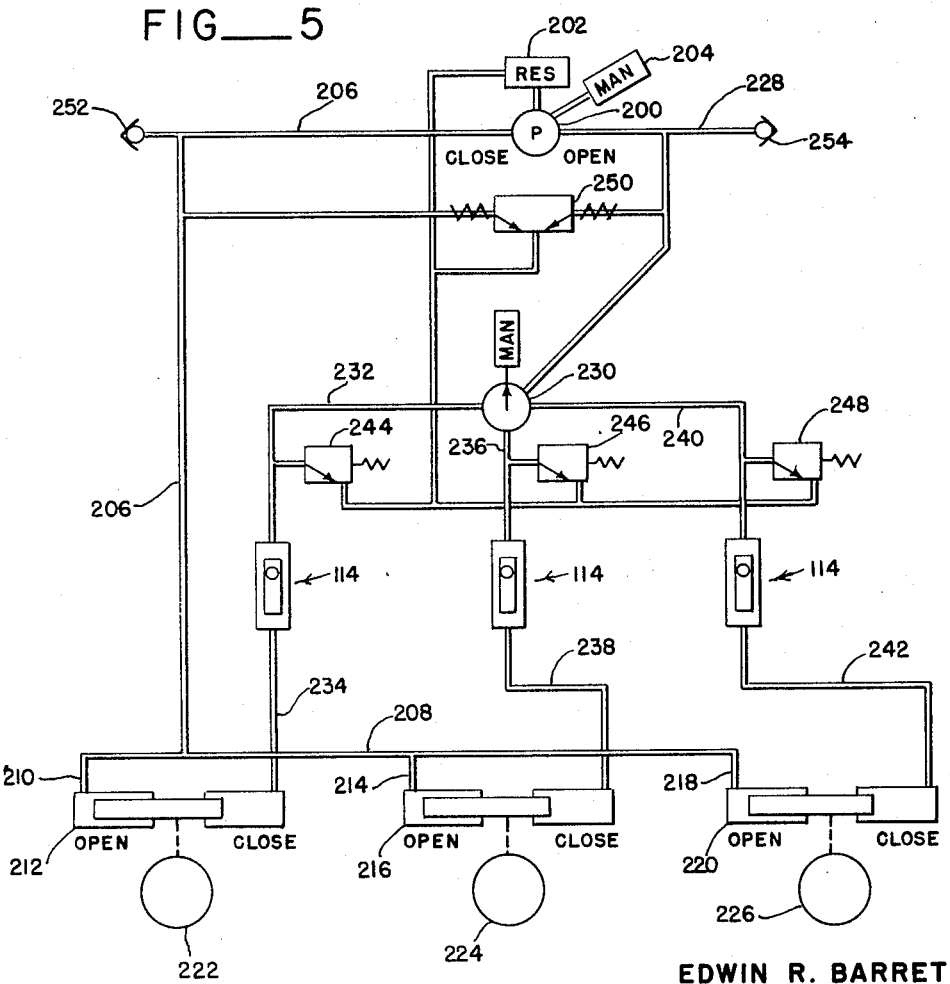
FIG__5
EDWIN R. BARRETT
INVENTOR.

United States Patent Office 3,439,706
Patented Apr. 22, 1969

3,439,706
REMOTE VALVE ACTUATION AND INDICATION SYSTEM
Edwin R. Barrett, 5113 25th Ave. NE.,
Seattle, Wash. 98105
Filed Mar. 2, 1966, Ser. No. 531,287
Int. Cl. B67d 5/22; F16k 31/12, 37/12
U.S. Cl. 137—554          10 Claims

ABSTRACT OF THE DISCLOSURE

Hydraulic actuation and indication system for remotely located valves. A power operated pumping system is connected to an actuator located in a tank which in turn is connected to a valve in the tank. An indicator is included in the circuit to show whether the valve is open or closed. A manually operated standby hydraulic circuit also connects to the actuator and indicator. Valving is provided so that the power circuit and manual standby circuit can be operated independently of each other.

---

This invention relates to a remote valve actuating system and indicator apparatus, and more particularly does it relate to a new and novel hydraulic actuation and indication system for valves and other mechanical motion devices in remote locations such as are found in many manufacturing plants and in ocean-going vessels.

It is well known in industry that heretofore known systems for operating remote valves have many disadvantages. Tankers, for instance, normally have a number of compartments and each compartment may have a filling, suction and stripping line with each line provided with a valve. Conventionally the valves are inaccessible and are operated by reach rods or linkages extending from the valve location to an operating station or position at some remote valve control station. In modern tanker design these valves are frequently installed inside the compartment (or tank) and are completely inaccessible during the service operating cycle. A typical reach rod installation may have one or more geared angle drives, numerous universal joints, several slip joints and all the attendant bearings mounting pads, brackets, service platforms and ladders. In addition, special attention must be given at times to locating valves in the piping or lines to allow for attachment of the reach rods. In some cases mechanical linkage systems require special bends in the piping layout. Another difficulty encountered is the amount of backlash and rod twist which is inherent in reach rod installations. On typical installations lost motion between operator and valve can amount to plus or minus fifteen degrees or more. On gate valves, requiring many turns this loss is not as significant. However, with butterfly, plug, ball and other similarly functioning valves, where only a quarter turn or 90 degrees rotation is transmitted to the valve, such lost motion becomes excessive. Additionally mechanical linkage or reach rod installations make it difficult to operate the valves. The person operating does not really known what has been accomplished even after the valves have been operated. These linkages or reach rod installations therefore are not particularly reliable, they are expensive, heavy, and awkward, and the backlash becomes a hazard to operating personnel.

This invention, representing a significant step forward in the art, substitutes suitably designed positive displacement and fixed volume hydraulic actuators directly connected to the valves with hydraulic piping from the actuator to the operating station. At the operating station manipulation of the actuator is accomplished by manual or electrical solenoid or hydraulic pilot and other types of operation of directional control valves in the hydraulic circuit. Alternately, the manipulation of the actuator may be done by an all manual hydraulic circuit. This would entail the use of an uni-directional hand hydraulic pump in a similar circuit or by the use of bi-directional hand pump with simplified valving.

Hydraulic operating pressure is provided either by a central hydraulic system or by a manually operated pump or both. In addition the valve open or closed position is indicated by an indicator device incorporated in the hydraulic system. The invention accomplishes all the required functions of a reach rod or solid linkage installation and in so doing eliminates many of the difficulties which have plagued plant operators and tanker owners. This invention has equally advantageous application for tool positioning on lathes, punches and presses and other areas in which valves are not immediately visible.

Accordingly it is among the many advantages and features of this system and apparatus that there are no restrictions placed on locating or positioning a valve in a remotely located line in order to accommodate actuating and indicating means. In other words, the actuator is mounted on the valve in any desired position. Hydraulic lines may be routed into valve and actuator locations more conveniently and economically with minimum concern for stressing of plant walls, bulkheads and decks. This system provides for the installation of hydraulic lines and operating stations so as not to obstruct passageways and other critical spaces as would linkages and reach rods. A particular valve is not limited in size by either the manual or the power operation thereof. The system provides for easy access to the operating station for remote damage and fire control. The system contemplates remote manual and/or electric-hydraulic push button operation. Because of this invention central control of all valves is made feasible, and there is no limit to the number of remote operating stations. Hydraulic positive displacement as opposed to mechanical linkage control gives positive operation and indication, in contrast to backlash and torsional lost motion which is inherent in mechanical linkage systems. The hydraulic valve operating circuits are protected against over-pressure either by misuse or by thermal expansion. Similar protection is most often impossible when solid mechanical linkages are employed. The system can be installed at minimum cost in that only two hydraulic lines connect the valve actuator and the hydraulic control panel. The system involves reduced maintenance compared to reach rods. Also the hydraulic system and apparatus herein provided give the needed mechanical advantages in valve actuation, but also have built-in control to prevent too rapid operation of the valves, thus preventing the possibility of piping system shock due to the Bernoulli effect of velocity head. The valve position indicator per se also has numerous features and advantages. No electric circuits are required in hazardous locations, and it always gives positive valve position indication. There are no exposed dynamic seals and there is little danger of hydraulic fluid contamination or spoilage of products, goods, or cargo. The indicator is such that it provides simple visual indication of valve position and furthermore it is inexpensive to produce. The position indicator recalibrates with each stroke if necessary. There is negligible pressure drop to the hydraulic system in which it is incorporated and requires only slight additions to hydraulic piping in order to be included in the system.

These and other objects, advantages and features, will become apparent in the details of construction and operation as more fully here and after described and claimed. Reference will be had to the accompanying drawings wherein like numerals will refer to like parts throughout, and in which:

FIGURE 1 is a schematic diagram showing how a plurality of remote and inaccessible locations may each be provided with a valve for remote actuation and indication including plug-in connections for a portable auxiliary manual standby;

FIGURE 2 is a schematic circuit diagram of the elements of this system wherein a power hydraulic system is used with a continuously connected manual hydraulic standby;

FIGURE 3 is a cross-sectional view partially broken away showing the details of the valve position indicator;

FIGURE 4 is a partial view in cross section showing an adjustment feature in the position indicator of FIGURE 3 for regulating the travel distance of the indicator piston; and FIGURE 5 is a schematic circuit diagram showing a silghtly modified actuation and indication system for manual operation of remote valves.

Referring now to FIGURE 1 it will be seen that remote, inaccessible valve locations, such as are found in a tanker cargo compartment generally designated by the number 10, are covered by deck or tanktop 12, and have bulkheads 14 and 16, and tank bottom 18. Each compartment of the tanker may have a fill line 20, a suction line 22, and a stripping line 24. Each of the lines in turn may have a valve numbered 26, 28, and 30 respectively. While the system to be described contemplates butterfly, plug, or ball valves, it must be kept in mind that the system may also incorporate gate and other types of valves. The invention is concerned with a manual standby as well as a central control panel or pumproom "push button" operation which employs a central hydraulic system. With the advances made in recent years, the use of hydraulic systems aboard ships, on aircraft, in missiles, and in manufacturing plants has developed to the point that fitting of hydraulic components and lines can be done without leakage or failures even though the equipment may be installed by mechanics of lesser skills and despite the fact that the systems may be subjected to shock, operator maltreatment, and even excessive pressures. Each of the valves 26, 28, and 30 will be directly connected to a fixed volume actuator 32, 34, or 36. The specific type of actuator used will be determined by the type of valve incorporated. In the case of 90 degree operating valves the valve closure element is directly attached to the actuator and movement may be accomplished by scotch yoke, rack and pinion, cylinder and piston, or other conventional means. There are numerous types of fixed volume actuators which those skilled in the art are aware of as being available for this type of service. The actuators and valves as mentioned above, are located in remote positions with hydraulic lines leading to the control and indicator elements at an appropriate station or control center.

The central system will be provided with a main hydraulic pressure line 50 and a return or low pressure line 52. Pressure line 50 will be connected to four way diverter valve 54 which may be operated by hand so as to switch the actuator and indicator system over to manual. The manual standby will have element 62, such as a hand wheel, crank or lever for generating line pressure and will also include reservoir 64 for hydraulic fluid. Hand wheel 62 will actuate hand pump 66 which is preferably but not necessarily a fixed capacity device. Hand pump 66 will have lines 68 and 70 leading to diverter valve 54. The standby portion of the circuit is also provided with a relief valve 72 as a safety measure for preventing over loading of the circuit.

From diverter valve 54 a main pressure line 74 branches into lines 76, 78 and 80 in order to direct hydraulic fluid under pressure to each of the individual valve control systems. Said lines 76, 78, and 80 are received into directional control valves 82, 84, and 86 having a basic purpose of either shutting off the hydraulic system to a particular valve and actuator, or of directing the pressure line to one side of the valve actuator to the other in order either to open or close the valve. The directional control valves are generally operated by solenoids and/or manual override levers for manual setting, in order to direct flow to one side or the other of the actuators. They are also as mentioned above provided with manual operation so that before the operator can use the hand pump 66 he must manually set the particular directional control valve with which he is concerned. The directional control valves 82, 84, and 86 of FIGURE 2 will be such that they are normally spring biased to close off flow to either side of the valve actuator. Push button actuation of a solenoid will set the valve as desired for directing fluid to the appropriate side of the actuator. However, for manual operation or standby the directional control valves will have to be manually set and direction of operation of the line valve determined by turning the manual hand wheel either clockwise or counterclockwise, as with the permanent bi-directional standby unit in FIGURE 2. On the other hand a uni-directional manual standby shown in dash-dot lines in FIGURE 2 must have the pressure and return lines reversed by rapid coupling means in order to achieve direction control. In addition diverter or change over valve 54 has a return or low pressure line 88 which also branches into line 90 leading to directional control valve 82, line 92 leading to directional control valve 84 and line 94 leading to valve 86. Flow control valves 96, 98, and 100 are provided in lines 90, 92, and 94 to regulate the volume of fluid passing through the hydraulic system to thereby control the speed at which the actuators are operated. Directional valves 82, 84, and 86 have downstream lines 102, 104, and 106 which direct hydraulic fluid to one side of the actuators 32, 34, and 36. In like manner second lines 108, 110, and 112 from each of the directional control valves direct fluid to the other side of said actuators. Thus, it will be seen that the system herein described is a closed positive displacement, hydraulic circuit.

Since each valve is actuated in the same way as the others each valve circuit may be provided with an indicator generally designated by the number 114. For purposes of illustration indicators 114 have been shown to be placed in line 108, 110, and 112. Lines 74 and 88 between the diverter valve 54 and the directional control valves 82, 84, and 86 are furnished with pressure gauges 116 and 118. Additionally, pressure relief valve 72 in the standby side of the circuit is so designed that whether pressure is applied to line 70 or through 68 it will still guard against excessive pressures or overloading.

In addition a line 65 will lead from relief valve 72 to reservoir 64 in the permanent manual standby portion of the system. Since the valves in this hydraulic system may be activated in groups or singly, and in order to protect against damage by thermal expansion, relief valves are also inserted in the individual valve circuits between the actuator and the direction control valves. Thus both pressure and return lines 102 and 108 are connected to relief valve 67, and which relief valve 67 is in turn connected by line 69 to pressure return line 90. In like manner pressure relief valve 71 is connected to both pressure and return lines 104 and 110 and in turn is connected by line 73 to branch return line 94. Similarly relief valve 75 is connected to both actuator pressure and return lines 106 and 112 and in turn is connected by line 77 to a branch return line such as 94 or 88.

FIGURE 2 also shows how a movable or portable manual standby may be attached to an individual valve and actuator circuit. This movable or portable standby, shown in dash-dot lines, will have a pump 79, a reservoir 81, and a hand wheel 83. Pump 79 will be connected by line 85 and line 87 to the pressure and return lines 106 and 112 leading from direction control valve 86 to actuator 36. This portable manual standby assembly will be such that lines 85 and 87 are flexible and such that they will have a quick coupling connection to the actuator pressure and return lines. Pump 79 may be uni-directional so that in order to reverse flow in lines 106 and 112 it would be necessary to reverse the connections of lines 85 and 87 to said permanent actuator lines 106 and 112. Such a portable manual standby eliminates the need for a permanent manual standby as exemplified by pump 66. A portable standby as shown in the dash-dot lines enables elimination of permanent standbys although it does require quick coupling and therefore could only actuate one valve or at most a small number at a time. It might also be mentioned that in the permanent standby, pump 66 could also be uni-directional so long as the direction control valves 82, 84 and 86 could be manually set in both positions rather than in one position which requires a bi-directional pump.

The valve position indicator, as shown in FIGURE 3, includes a housing 120 which is generally cylindrical or tubular and made of suitable non-magnetic material such as brass or plastic. The housing is an elongated member closed at its ends as by having block or cap 122 at one end and at the other block or cap 124. End blocks 122 and 124 are of sufficient depth or thickness to accommodate fittings and other elements to be described hereinafter. The end blocks seal the interior of tubular housing 120 so as to define piston chamber 126. Indicator 114 is mounted by end plates or brackets 128 and 130. The brackets have mounting feet 132 and 134 for attaching the indicator either horizontally or vertically to a control panel. End blocks or caps 122 and 124 have line connector ports 134 and 136. Connector ports 134 and 136 allow indicator 114 to be piped into the hydraulic circuit of FIGURES 2 and 5 between the direction control valve and the valve actuator. Since the end caps or blocks 122 and 124 are shown to be of substantial depth, connector ports 134 and 136 communicate with passages 138 and 140 which lead into piston chamber 126. However, no limitation on end blocks is intended so long as they function as required. In addition each end block is optionally provided with venting passages 142 and 144 leading from the inside of the block or cap to atmosphere. The need for vents in the indicator may or may not arise depending upon how it is incorporated in the system. Venting passages 142 and 144, if included, may be opened and closed by use of conventional means such as steel balls 146 and 148 which are held in position by set screws 150 and 152. Obviously, other types of venting passage structures could be incorporated. This venting capability, when desired, may be omitted or supplemented by additional vents according to individual system requirements.

In piston chamber 126 is located the piston, generally designated by the number 154. The piston must have a length to diameter ratio sufficient to prevent any possibility of its binding or cocking since it is a sealed free-floating element designed to move with hydraulic fluid displacement. The piston has body member 156 and the one end thereof is radially inwardly offset to accommodate ring magnet 158. Ring magnet 158 is held in place on the piston by detachable retainer member 160. The piston is provided with two relief passages 162 and 164, with each of the passages being provided with relief valves 166 and 168. Relief valves 166 and 168 are one-way spring loaded relief structures to allow the piston assembly to be zero positioned or calibrated in either direction of movement at the termination of each stroke. Generally speaking the indicator piston chamber 126 should be capable of receiving substantially the entire actuator flow, in either direction in order to maintain accurate registry of the valve position. End caps or blocks 122 and 124 and piston 154 are provided with packing or seals 170, 172, and 174, and 176. While a preferred embodiment of the piston would include a ring magnet, it must nevertheless be realized that a magnet of sufficient strength to move the follower may take many shapes and therefore it is not intended to place limitations on this particular element.

Extending between end plates or brackets 128 and 130 is transparent tubular element 178 or other guide mechanism which is also located in close proximity to housing 120. The follower may also be mounted for sliding movement on a rod or confined for sliding movement between rods, or otherwise incorporated by other means. Transparent tubular or guide element 178 contains a magnet or magnetic follower 180. Guide 178 may have guide track means if desired and the follower 180 is shaped so that it will not stick or bind as it moves with magnet 158 in piston 154. Guide 178 is also of non-magnetic material. Also located outside housing 120 but in close proximity thereto is a limit switch mounting means 182 which houses magnetically actuated limit switches 184 and 186. The limit switches 184 and 186 are positioned in means 182 so that as the piston completes a stroke in one direction the magnet is brought into general alignment with a switch thereby actuating said switch to turn on a light or actuate a signal, such as a horn or bell, to shown the valve is either open or closed. Also, additional switches may be used at will to signal intermediate positions as desired. Electrical wiring from means 182 is sheathed in cable or conduit 188 leading from said switch means. The lighting and limit switch features are considered optional though preferable in this invention if other registering or locating functions are desired.

FIGURE 4 illustrates an end block 190 having an adjustability feature therein for regulating the distance of the piston movement. Such adjustability feature either on one end or both ends of the indicator 114 allows the indicator to be calibrated to various sizes of fixed volume actuators. Block 190 will have connector port 192 and illustrates that location of connector ports at each end of the indicator may vary. End block 190 also has sealing means 194. The adjustability feature, for purposes of illustration, is seen to be a bolt member 196 threaded axially through the end block and mounting brackets 130 so that the inner end of said bolt 196 may be withdrawn into its threaded passage or may be made to extend into chamber 126. A lock nut 198 or other securing means may be included in order to hold adjustment bolt 196 in place. Those skilled in the art may devise other means for regulating the stroke distance of piston 154.

FIGURE 5 represents a manual valve operation and indication circuit which employs a selector valve. The selector valve 230 as shown is such that one line valve and its fixed volume actuator at a time can be selected for operation. The bi-directional hand pump 200 has reservoir 202 and manual lever, crank or hand wheel 204 for operating the pump. One side of the pump has line 206 leading to header or manifold 208 which is directly connected to one side of each of the group of actuators with which this particular circuit is concerned. Header or manifold 208 thus is connected by line 210 to actuator 212, by line 214 to actuator 216, and by line 218 to actuator 220. Actuator 212 in turn is directly connected to line valve 222, actuator 216 is directly connected to valve 224, and actuator 220 is directly connected to line valve 226. The other side of pump 200 is connected by line 228 to manually set selector valve 230. Selector valve 230 is shown to select one valve at a time but could select more than one by modification of the selector. Thus, line 232 leads from selector valve 230 to position indicator 114 which in turn is connected by line 234 to the opposite side of actuator 212. In like manner line 236 leads from selector valve 230 to indicator 114 which also in turn is connected by line 238 to the opposite side of actuator 216. Similarly line 240 is connected between selector 230 and indicator 114, which in turn is connected by line 242 to the opposite side of actuator 220. A thermo-relief valve 244 interconnects line 232 with reservoir 202, relief valve 246 interconnects line 236 with the reservoir, and thermo-relief valve 248 interconnects line 240 with the reservoir. A relief valve 250 cross connects the main lines 206 and 228 leading from the hand pump and it in turn is also connected to reservoir 202. Quick coupling connections 252 and 254 are also provided in the main lines 206 and 228 on each side of hand pump 200.

What is claimed is:
1. A valve position indicator, comprising: (a) an elongated, tubular, sealed housing made of non-magnetic material, said housing being closed at both ends to define a piston chamber for receiving hydraulic fluid therein, (b) a piston means snugly received in said chamber and shaped to the cross-sectional configuration of said housing, said piston means also being made of generally non-magnetic material, being axially freely slidably movable in said chamber and including sliding seal means between it and said housing, movement of said piston being caused by the application of fluid pressure through one of said closed ends into said chamber on one side of said piston, (c) a magnetic means directly secured to said piston within said chamber, (d) a magnet follower means located outwardly of said chamber, laterally of the piston and the magnetic means carried thereby, and guide means for said follower means supported to one side of and generally parallel to said chamber, whereby said follower means is guidably received for free slidable movement relatively along said guide means in response to movement of said piston and said magnetic means; and (e) port means in each of the closed ends of said housing opening into said chamber for connection to fluid lines for directing fluid into and out of said chamber on both sides of said piston.

2. The valve position indicator of claim 1 wherein at least one of said closed housing ends has an adjustment feature incorporated therein for varying the distance through which said piston moves in said chamber.

3. The valve position indicator of claim 1 wherein magnetically responsive switch means are located outside said housing at predetermined locations and are energizable by said piston magnet.

4. The valve position indicator of claim 3 wherein said piston is provided with pressure relief valve means to permit fluid pressure on either side of said piston to be relieved to the non-pressured side thereof.

5. The valve position indicator of claim 1, wherein said magnetic means is bodily incorporated within the piston.

6. The valve position indicator of claim 1, further including magnetically responsive switch means supported laterally of said housing and of the longitudinal path of said magnetic means, at a position circumferentially spaced about said tubular chamber from said magnet follower means and its guide means.

7. A remote valve actuation system for tankers, comprising:
a fluid conduit containing a main valve;
a reversible fluid motor connected to said main valve for opening and closing same, said motor including two fluid ports;
a reversible motor circuit comprising a first pair of conduits connected to said ports, for interchangeable use as pressure and return lines for said fluid motor;
a main fluid supply and return circuit including a second pair of conduits connected to said first pair of conduits, to serve as pressure and return lines therefor;
a reversible secondary fluid supply and return circuit including a pump having two ports and a third pair of conduits connected to said ports, to serve as pressure and return lines for said first pair of conduits and said pump during use of said secondary circuit;
dual purpose valve means interconnected between said first and second pairs of conduits, for establishing fluid communication between said first and second pairs of conduits during use of said main fluid circuit, and for closing said second pair of conduits to flow from said first and third pairs of conduits during use of said secondary circuit; and
means for connecting said third pair of conduits to points in said first pair of conduits between said valve means and said fluid motor, with the connections being of a type which permit any secondary fluid introduced into a motor circuit conduit to flow in such conduit both towards and away from said dual purpose valve means.

8. The remote valve actuation system of claim 7, further comprising a valve position indicator means incorporated within said first pair of conduits and operable by flow in either direction to indicate the position of the main valve during use of either the main or the secondary supply and return circuits.

9. The remote valve actuation system of claim 7, further comprising a pressure relief valve in the motor circuit, between said motor and the points of connection of said third pair of conduits with the first pair of conduits, so that such relief valve means is operable during use of either the main or the secondary supply and return circuits.

10. The valve actuation system of claim 7, wherein said main fluid circuit includes a reversible pump and conduit means for connecting such pump to said second pair of conduits.

References Cited
UNITED STATES PATENTS

| | | |
|---|---|---|
| 2,755,966 | 7/1956 | Lindars. |
| 3,009,474 | 11/1961 | Crichton _____ 137—344 |
| 3,156,255 | 11/1964 | Gasquet et al. ___ 251—289 XR |
| 3,181,360 | 5/1965 | Hederhorst _____ 73—270 |
| 3,223,069 | 12/1965 | Albright _____ 116—70 |

HENRY T. KLINKSIEK, *Primary Examiner.*

U.S. Cl. X.R.

73—239; 116—70; 137—344; 251—26, 289